United States Patent [19]
Stefanelli

[11] 3,837,508
[45] Sept. 24, 1974

[54] CARGO HANDLING SYSTEM
[76] Inventor: William L. Stefanelli, 1945 W. Yale, Fresno, Calif. 93721
[22] Filed: Apr. 19, 1972
[21] Appl. No.: 245,479

Related U.S. Application Data
[63] Continuation-in-part of Ser. No. 38,155, May 18, 1970, Pat. No. 3,688,926.

[52] U.S. Cl............ 214/83.22, 198/118, 214/77 P, 214/518
[51] Int. Cl.............................................. B60p 1/36
[58] Field of Search............................ 214/82, 83.22

[56] References Cited
UNITED STATES PATENTS
2,679,941   6/1954   Roesies........................... 214/83.22
2,912,129   11/1959   Varrone.............................. 214/82
3,578,186   5/1971   Thomas............................ 214/82 X
3,656,638   4/1972   Hutton et al..................... 214/82 X Primary Examiner—Robert G. Sheridan
Attorney, Agent, or Firm—Huebner & Worrel

[57] ABSTRACT

A cargo-handling system particularly suited for use in loading and unloading cargo carriers, characterized by a cargo conveyor for positioning cargo at selected and convenient locations within a carrier, such as a truck, and a cargo delivery transport including a delivery conveyor for delivering cargo to and from the cargo positioning conveyor, whereby the efficiency and economy of cargo-handling operations are enhanced.

4 Claims, 17 Drawing Figures

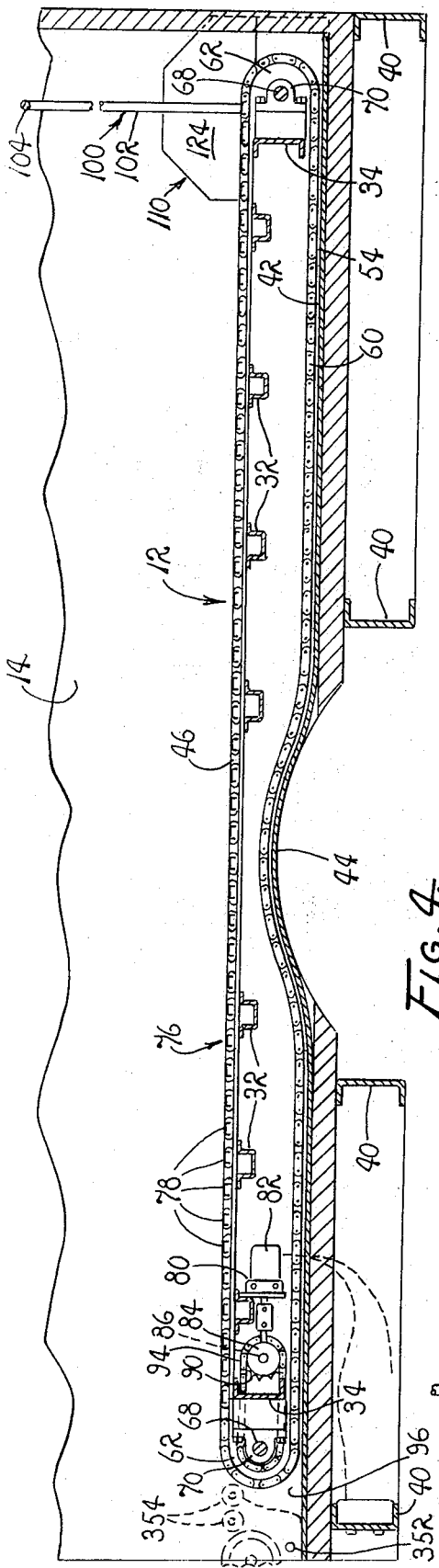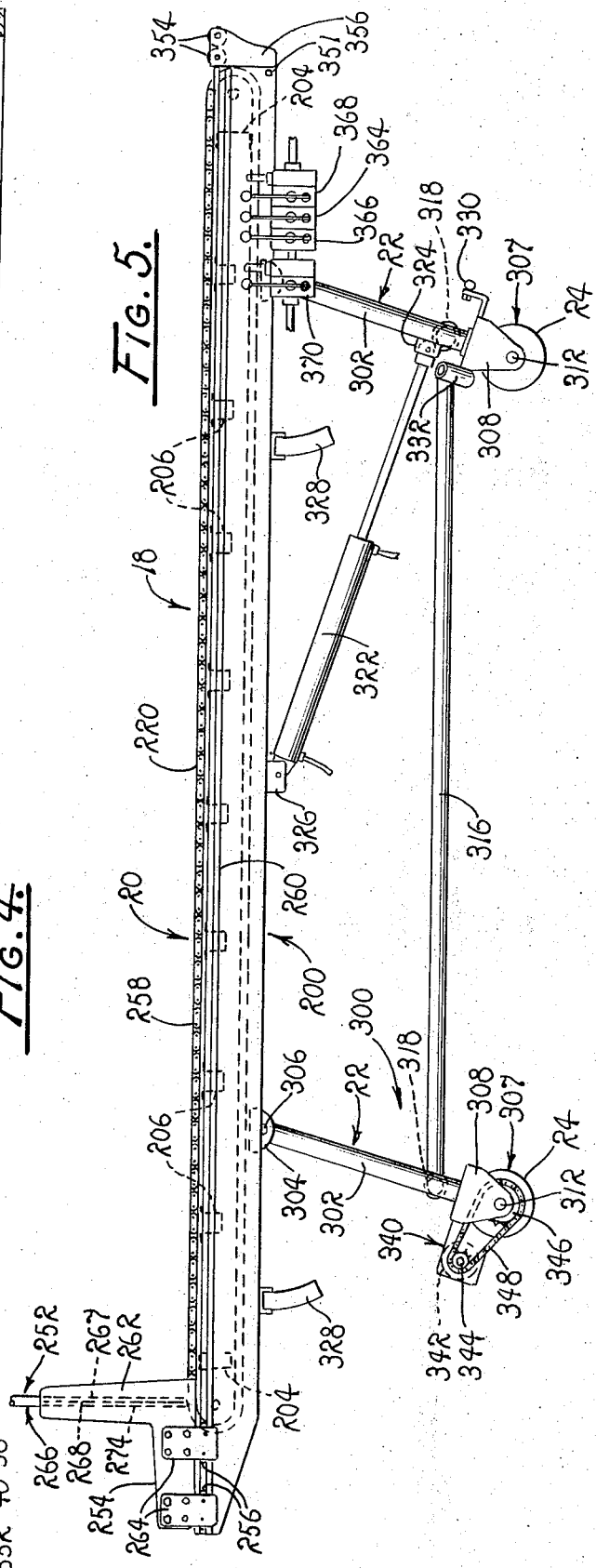

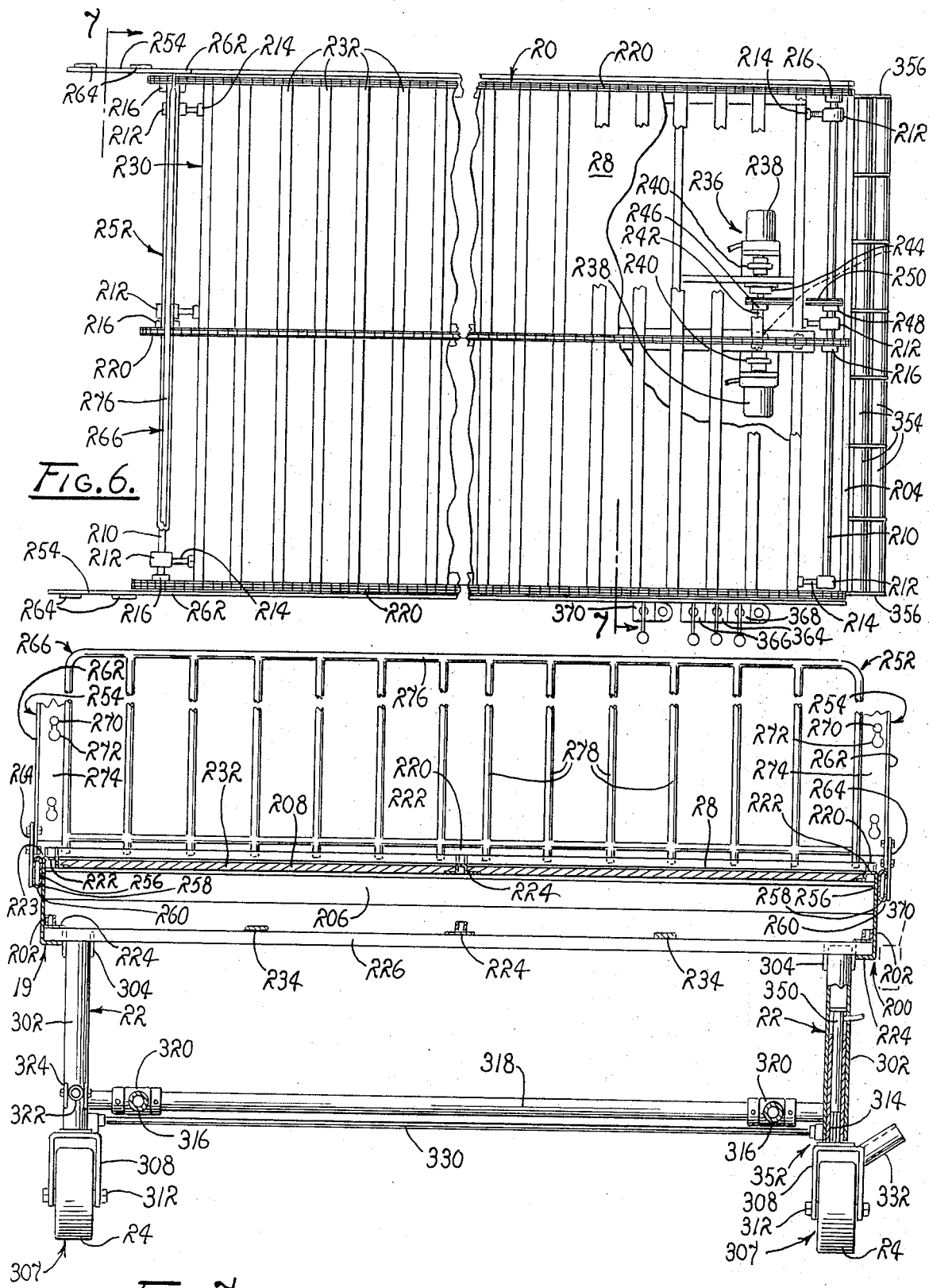

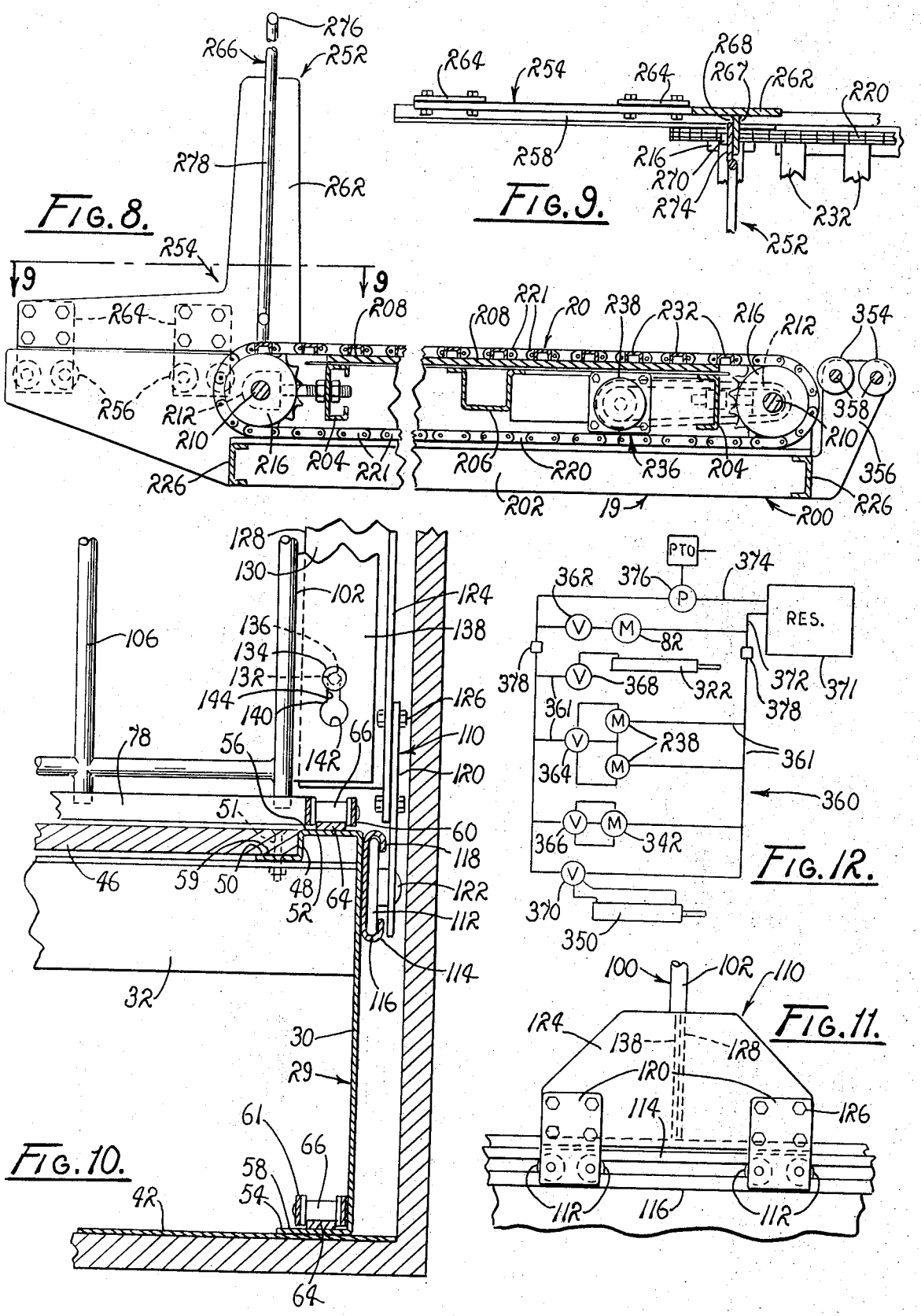

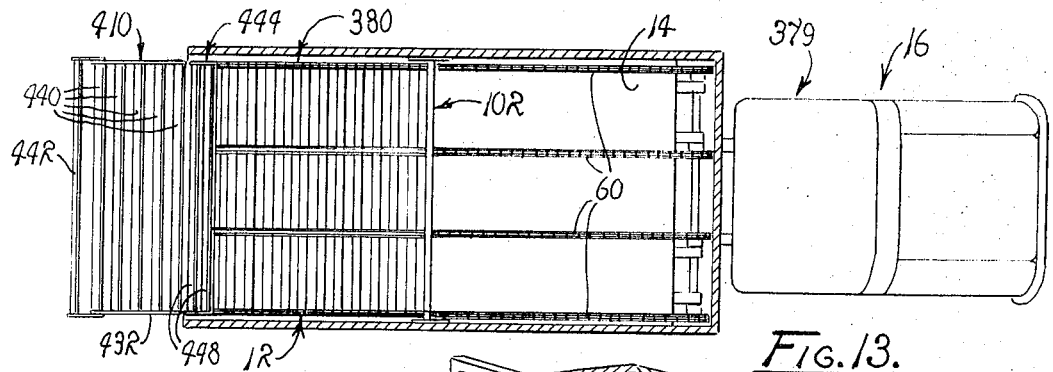
FIG. 13.
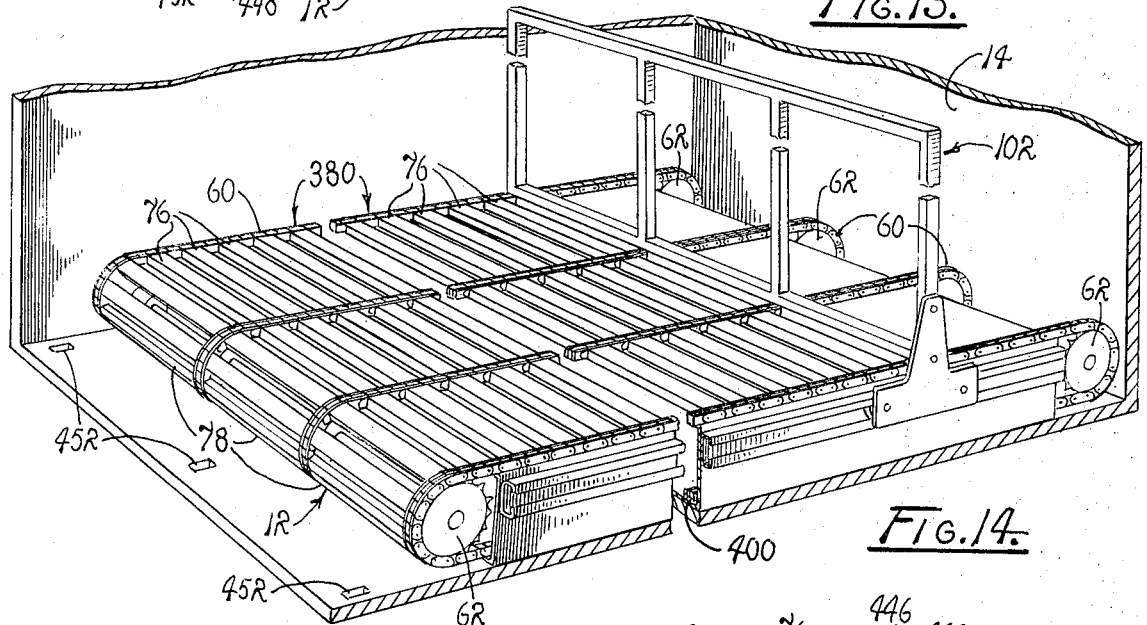
FIG. 14.
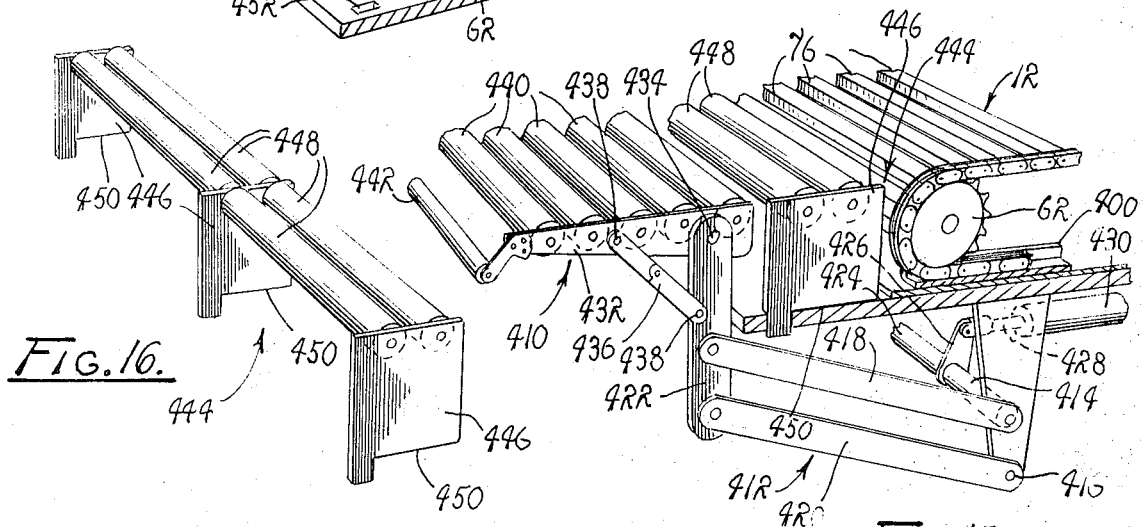
FIG. 16.
FIG. 15.
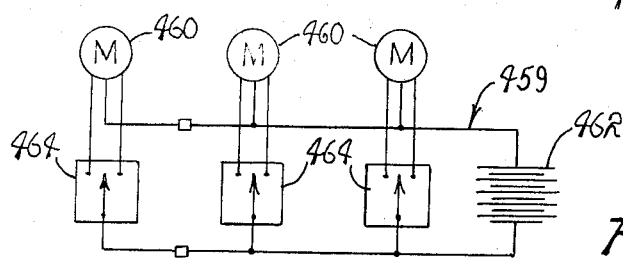
FIG. 17.

CARGO HANDLING SYSTEM

This application is a continuation-in-part application of United States application Ser. No. 38,155, filed May 18, 1970, now U.S. Letters Pat. No. 3,688,926.

BACKGROUND OF THE INVENTION

The invention relates to cargo handling systems and more particularly to a cargo-handling system which includes a plurality of laterally extended conveyors, the combined reach of which is employed in cargo-handling operations whereby loading and unloading of cargo carriers are facilitated.

The prior art is replete with cargo-handling devices for use in loading and unloading cargo carriers employed in delivering cargo betwen points of destination. Normally, in loading and unloading transports such as aircraft, trucks, and the like, significant quantities of time and manual labor are expended in order to assure that cargo being handled appropriately is positioned or stowed, secured and transported to distant terminals for ultimate discharge and delivery. Even in instances wherein conveyors, forklifts, and similar cargo-handling devices are employed, significant expenditures of time and manual labor attend cargo-handling operations. For example, it is common practice to position a truck in a mated relationship with a platform, such as the dock of a warehouse, and then deliver cargo, including cartons, cases, and the like, from the dock to the truck, employing forklifts, dollies and similar devices. The thus delivered cargo then is stowed in a secured configuration within the confines of the truck for subsequent transport to distant destinations. Once a thus loaded truck reaches a selected destination, it again is mated with the dock of a depot or warehouse and an unloading operation is performed employing devices quite similar to those employed in loading the truck.

Additionally, it can be appreciated that the loading and unloading operations, as currently performed, require significant "turn-around" time. Quite frequently, attempts are made to reduce this turn-around time by employing a single tractor with multiple trailers, in order that a single tractor and its operator can continuously be employed with a series of loaded trailers, while a series of unloaded trailers continuously is being loaded. Of course, such operations result in congestion at terminals and often require large investments in rolling stock.

In practice, cargo being delivered in commerce often is "palletized" and/or "containerized" so that the cargo can be handled as large integrated units. However, this system fails to satisfy existing needs where the cargo is delivered over relatively short distances and/or "partial loads" must be distributed in the form of individual items such as crates, cartons, sacks of bulk items, and the like.

Furthermore, where a cargo is delivered as partial loads it currently is necessary that the operator enter the carrier and manually discharge the cargo from the transporting carrier. As can be appreciated, this technique is quite expensive in terms of labor and lost time. The inadequacy of this cargo-handling technique particularly can be appreciated in instances where a single large truck, or van, is employed for distributing a plurality of partial loads at numerous distribution points, located along a given route, or where numerous small delivery vehicles must be loaded from a single large truck.

In addition to the foregoing, it is well appreciated by operators of cargo carriers that a load must be properly oriented in order for the center of gravity to be adequately positioned for achieving a desired response from the carrier. Thus, existing carriers are inadequate in this respect since no provision is made for reorienting, to shift the center of gravity of a remaining portion of a load subsequent to a delivery of a partial load.

Hence, there currently exists a need for a practical cargo-handling system employable in operations wherein loading and an unloading of cargo carriers, such as trucks, aircraft and the like, must be achieved in a practical, rapid, safe and economic manner.

OBJECTS AND SUMMARY OF THE INVENTION

Therefore an object of the instant invention is to provide an improved cargo-handling system.

Another object of the invention is to provide an improved cargo-handling system having particular utility in loading and unloading cargo carriers such as trucks and the like.

Another object is to provide an improved cargo-handling system for use in delivering and picking-up multiple partial loads utilizing highway vehicles.

Another object is to provide for use in cargo-handling systems a cargo positioning conveyor arranged within a cargo compartment of a carrier, such as a highway vehicle, for purposes of positioning cargo at selected locations within the compartment.

Another object is to provide in a cargo-handling system a conveyor for positioning and repositioning cargo within the cargo compartment of a highway vehicle regardless of whether or not the cargo is palletized or handled as mutually discreet articles such as cartons, sacks and the like.

Another object is to provide, in a cargo-handling system, a cargo delivery unit particularly suited for use in expeditiously delivering assembled loads of cargo between a warehouse and a cargo carrier.

Another object is to provide a cargo transport including a laterally extended cargo delivery conveyor positionable in operative alignment between a cargo positioning conveyor and a given dock, whereby the combined reach of the conveyors is rendered employable in delivering cargo between the cargo positioning conveyor and the dock.

Another object is to provide a cargo positioning device disposed within a cargo compartment of a cargo carrier adapted to serially deliver adjacent segments of a segmented load of cargo to a cargo discharge station for thus facilitating expeditious delivery of a series of load segments.

Another object is to provide in a cargo-handling system including a conveyor within a cargo compartment and elevator disposed adjacent to the conveyor for receiving cargo from the conveyor and thereafter lowering the cargo to ground level and for subsequently discharging the cargo from the elevator.

These and other objects and advantages of the instant invention are achieved through the use of a plurality of alignable conveyors including a first plurality of laterally extended chains operatively arranged within a cargo carrier, and provided with a traveling bulkhead, and a second plurality of horizontally oriented endless chains operatively supported by a cargo transport or warehouse unit, also provided with a traveling bulkhead, positionable to extend between a warehouse and the carrier for receiving and laterally transporting cargo between the carrier and warehouse, and an elevator mounted on the carrier adjacent to the discharge end thereof for elevating and lowering partial loads to ground level.

Figure 2:
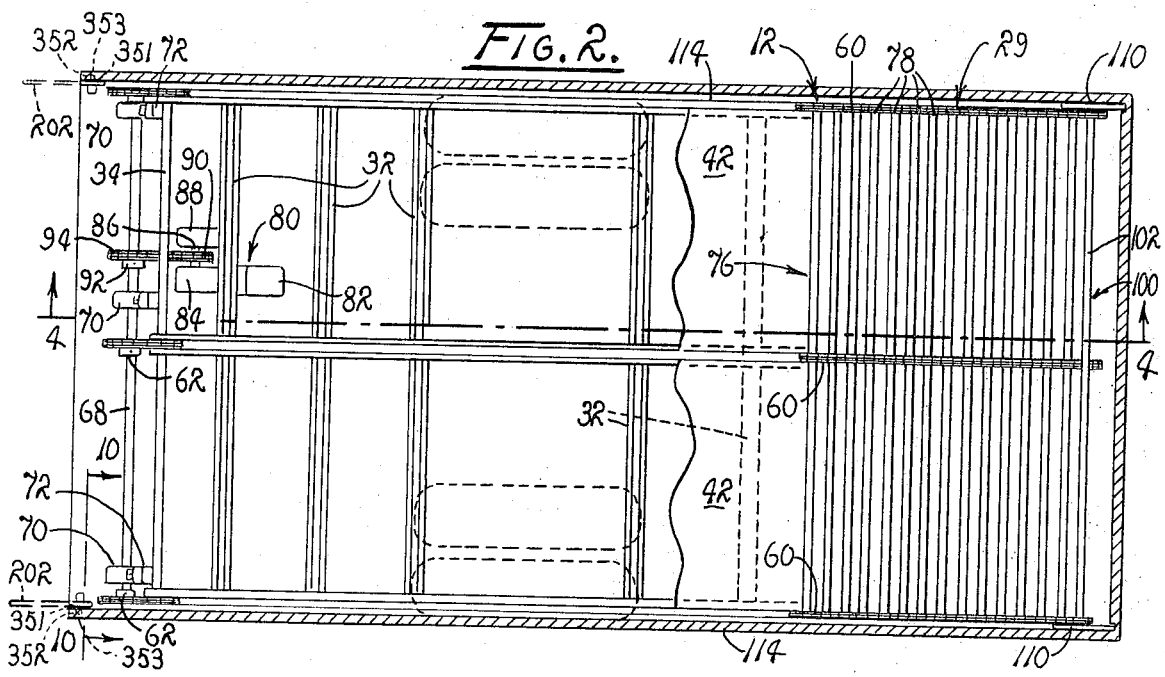
FIG. 2 is a partially sectioned plan view, on an enlarged scale, of the cargo compartment of FIG. 1, illustrating an operative disposition of the cargo positioning conveyor.

4. is a partially sectioned side view, taken generally along line 4—4 of FIG. 2.

Figure 1:
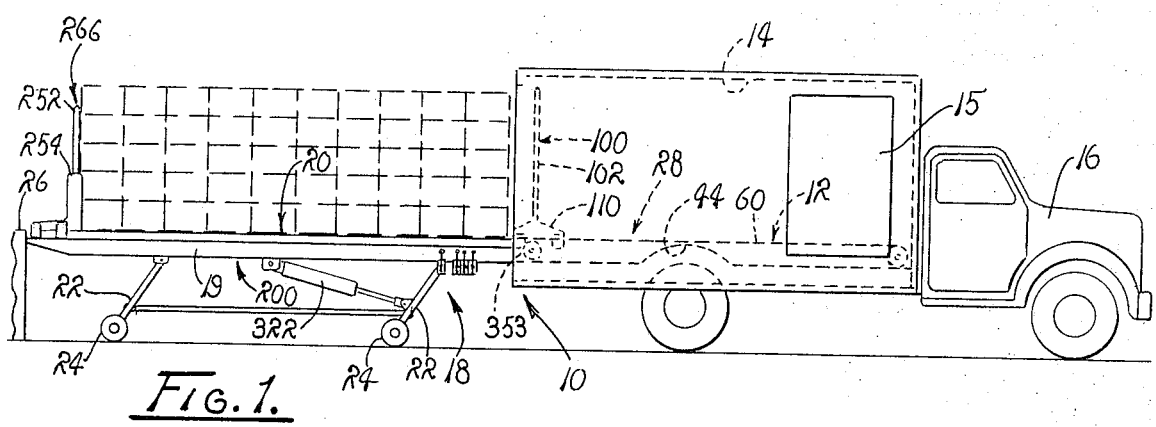
FIG. 1 is a side elevation of a cargo-handling system of the instant invention, including a warehouse unit and a cargo positioning conveyor disposed within a cargo compartment of a highway vehicle.

FIG. 5 is a side view, on somewhat of an enlarged scale, of the warehouse unit utilized by the system shown in FIG. 1.

FIG. 6 is a top plan view of the warehouse unit shown in FIG. 5. FIG. 7 is a partially sectioned end view of the warehouse unit.

FIG. 8 is a partially sectioned, fragmentary view, taken generally along line 7—7 of FIG. 6, but on somewhat of an enlarged scale, illustrating a vertical support for the traveling bulkhead employed in laterally supporting cargo.

FIG. 9 is a partially sectioned, fragmentary plan view of the support of FIG. 8.

FIG. 10 is a fragmentary, cross-sectional view, taken generally along line 10—10 of FIG. 2, but on a substantially enlarged scale.

FIG. 11 is a fragmentary side view of the support for the traveling bulkhead shown in FIGS. 1 and 4.

FIG. 12 is a diagrammatic view of an hydraulic circuit employed by the embodiment of the invention, illustrated in FIGS. 1 through 11.

FIG. 13 is a top plan view of a modified form of the cargo positioning conveyor shown in FIG. 2.

FIG. 14 is a perspective, fragmentary view of the conveyor illustrated in FIG. 13.

FIG. 15 is a fragmented view of an elevator operatively coupled with the conveyor shown in FIGS. 13 and 14.

FIG. 16 is a perspective view of a bridge employable with the elevator shown in FIG 15.

FIG. 17 is a diagrammatic view of an electrical system which is employable with the cargo-handling system illustrated in FIGS. 1 through 16.

DESCRIPTION OF THE PREFERRED EMBODIMENT

General Description

Referring now to the drawings wherein like reference characters designate like or corresponding parts throughout the several views, there is shown in FIG. 1 a cargo-handling system 10 embodying the principles of the instant invention.

As illustrated, the cargo-handling system 10 includes a cargo positioning conveyor 12, arranged within a cargo compartment 14 of a carrier 16, such as a truck or similar highway vehicle which serves as a cargo carrier for delivering cargo between points of origin and destination. Preferably, the compartment includes an access door 15 disposed to one side and near the front of the compartment. It is to be understood, of course, that the specific carrier can be anyone of a multitude of types of carriers, including vessels, boxcars, and aircraft, so long as the carrier includes an opening through which cargo is moved during loading and unloading operations.

Adjacent to the carrier 16, in alignment with the conveyor 12, there is positioned a warehouse unit 18. The unit 18 is configured to resemble a trailer and operatively serves to support a laterally extended cargo delivery conveyor 20. As a practical matter, the unit 18 includes a rigid, rectangular frame 19, FIG. 1, supported by a plurality of depending struts 22. The lower distal end of each of the struts is, in turn, supported by a wheel 24 rotatably coupled thereto. The wheels 24 serve to support the transport 18 as mobility is imparted thereto, whereby the unit, in operation, is selectively positioned between an elevated loading platform or dock 26 and the cargo compartment 14 for purposes of bridging the span therebetween.

Consequently, when employed in cargo-handling operations, the cargo delivery conveyor 20 serves as a mobile support for delivering an assembled load of cargo between the cargo compartment 14 of a carrier 16 and a given dock 26. Therefore, unbroken loads of cargo, including cartons, boxes, crates, bags and similar items, whether palletized or otherwise assembled, readily are loaded as well as unloaded. For example, in loading a carrier 16 a total load can be assembled on the warehouse unit 18 by an operator employing a forklift for adjacently positioning palletized cargo. Once assembled, the load is laterally translated into the cargo compartment 14 and secured in place through suitable tie-downs, not shown. Upon unloading, the load in its unbroken configuration is disgorged from the cargo compartment 14 onto a cargo delivery conveyor 20, whereupon it is delivered to an adjacent dock 26. Of course, it should be appreciated that loads of cargo can be delivered from the carrier 16 as load segments, or partial loads.

Cargo Positioning Unit For Cargo Carrier

As best illustrated in FIGS. 1 through 4, the compartment 14 of the cargo carrier 16 or highway vehicle is provided with a cargo positioning unit 28 which includes a cargo positioning conveyor 12. The conveyor 12 is supported in a laterally extended disposition by a frame 29 which preferably includes a pair of longitudinal channnular beams 30 extending along opposite sides of the longitudinal axis of the cargo compartment 14. In practice, these beams are interconnected through a plurality of transversely related beams 32, FIG. 4, having an inverted hat-shaped cross-sectional configuration, and a pair of transverse terminal beams 34, also of a channnular configuration.

Figure 3:
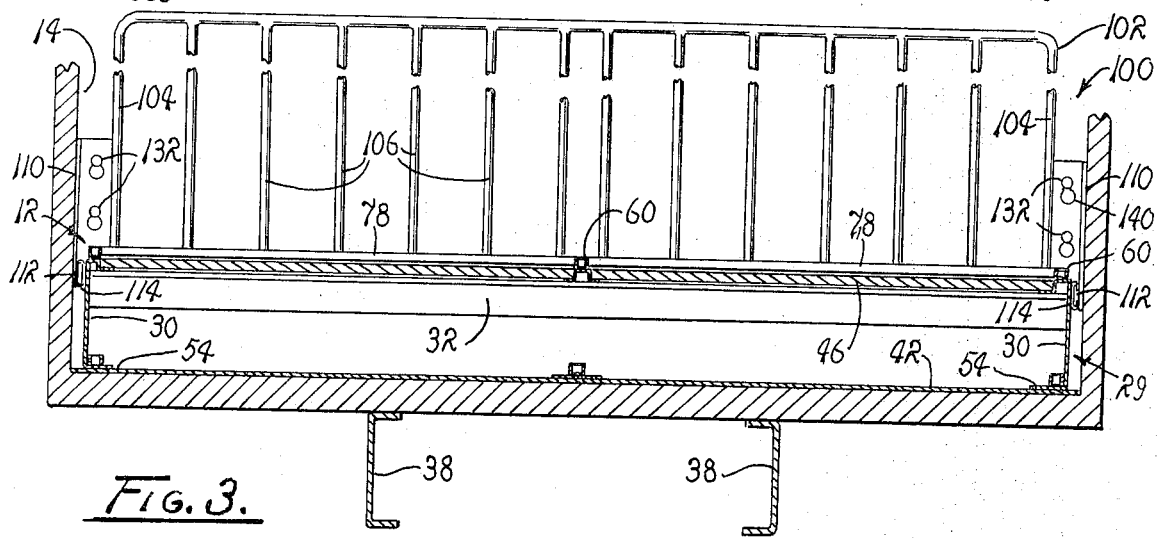
FIG. 3 is a partially sectioned end view of the cargo positioning conveyor, of FIGS. 1 and 2, particularly illustrating a traveling bulkhead employed in imparting lateral stability to cargo being handled.

As best illustrated in FIGS. 3 and 4, the cargo compartment 14 is supported by a pair of parallel beams 38 interconnected through a plurality of transverse channnular supports 40. As a practical matter, the compartment includes a planar floor 42 of a type commonly provided in van-type trucks.

Quite frequently, highway vehicles of the type employed as cargo carriers include a pair of wheel-wells formed within the floor of their cargo compartments in order to accommodate a positioning of the cargo compartment directly above its wheels. Therefore, as illustrated in FIG. 4, each of the longitudinal beams 30 includes a relieved portion 44 in order to accommodate a positioning of the frame 19 above the wheel-wells of the carrier 16.

Referring for a moment to FIG. 10, the beams 32 are butt-welded to the longitudinal beams 30 in an inverted disposition and serve as supports for a wooden floor 46. The floor 46 is, in effect, a false floor fabricated from sheets of plywood having a suitable thickness. where practical, the beams 30 are fabricated from structural beams of a type which include laterally extended angle members which serve quite satisfactorily as mounting brackets 48 for supportingly receiving peripheral surfaces 50 of the longitudinal edge portions of the floor 46. Of course, the brackets can be formed from an angle iron welded into place should the beams 30 not include suitable members. These portions are coupled to the beams 30 in any suitable fashion. For example, the brackets 48 are secured thereto through suitable screws 51. Also, it is to be understood that the floor 46 is coupled with the transverse beams 32 through appropriately distributed screws, not shown.

As best shown in FIG. 10, each of the beams 30 further includes an inwardly directed upper flange 52 and an inwardly directed lower flange 54. The upper flange 52 is provided with a laterally extended planer surface 56 while the inwardly directed lower flange 54 is seated on the floor 42, and includes a laterally extended planar surface 58. The laterally extended planar surfaces 56 and 58 of each beam 30 serve as supporting surfaces for operatively supporting the upper and lower runs of an endless chain 60 of a pair of such chains.

As best illustrated in FIGS. 2 and 4, each chain 60 substantially traverses the length of the cargo compartment 14 and is trained about a pair of spaced journaled sprockets 62. The upper and lower runs of the chain 60 are guided through the use of an elongated guide strip 64, FIG. 10, affixed to the upper surfaces 56 and 58 of the flanges 52 and 54, respectively. I practice, each of the chains 60 is fabricated from suitable links having overlapping parallel link-plates 61 joined through bearing pins, not designated. The plates are of a width sufficient to accommodate a seating of the strip 64 between the opposed vertical surfaces thereof in order to achieve a guiding function for the chains 60 as they are advanced about the sprockets 62. Mounted on the bearing pins, and extending between the plates 61, are support bearings 66 which sequentially are received between the sprocket teeth of the sprockets 62 as they are driven in rotation about an axis extending normal to the vertical plane of the chains 60.

Each of the sprockets 62 is pinned to a sprocketsupporting axle 68 which, in turn, is supported for rotation in a plurality of laterally spaced bearing blocks 70. Where preferred, the blocks 70 are fixed to the transverse terminal beams 34, through suitable brackets 72. While the brackets 72 are illustrated as being rigidly coupled to the transverse beams 34, it is to be understood that, where preferred, they may be so designed as to accommodate longitudinal adjustment whereby the distances between the sprockets 62 can be varied for varying the tension established within the chains 60.

As shown in FIG. 2, three conveyor chains 60 are provided in a spaced relationship, however, it is to be understood that as many chains 60 as is found desirable can be employed. While the number of chains 60, and the specific manner in which they are supported can be varied, it is preferred that all of the chains 60 be interconnected through a plurality of horizontally disposed flight bars 76.

The flight bars 76 are laterally extended between the chains 60 and are coupled therewith in a manner such as to be advanced thereby. Each of the flight bars 76 preferably is formed of a pair of aligned segments 78, the opposite ends of which are abutted with the plates 61 of the chains 60 and welded thereto. Hence, the flight bars 76 and the chains 60 are integrated into a single conveyor chain which serves as the cargo positioning conveyor 12 for transporting cargo in directions paralleling the longitudinal axis of the cargo compartment 14.

In order to advance the conveyor 12, the chains 60 synchronously are driven through a power train 80. This power train includes a selectively operable, reversible motor 82 operatively associated with a suitable gear train disposed within a gear box 84 and drivingly coupled with a transversely extended drive shaft 86. The motor 82 preferably is suspended from the rearmost transverse beam 32 in order that the drive shaft 86 may be employed in driving the rearmost sprocketsupporting axle 68. However, the positioning of the motor 82 is, in practice, varied between the opposite ends of the conveyor 12, as the operative environment dictates.

The drive shaft 86 is maintained in a parallel relationship with the associated axle 68 by a suitable bearing block 88 which is coupled with the rearmost terminal beam 34, preferably by welding.

The drive shaft 86, in turn, operatively supports a drive sprocket 90, FIG. 4, which is pinned or otherwise rigidly coupled to the drive shaft 86. This sprocket serves as the output sprocket for the motor 82 and acts to impose a selected rate of rotation on the axle 68. The sprocket 90 is coupled with the rearmost axle 68 through a driven sprocket 92. The sprockets 90 and 92 are interconnected through an endless drive chain 94 trained thereabout so that the drive sprocket 90 serves to impart rotation to the axle 68 as it is driven by the motor 82, acting through the drive shaft 86. Depending upon the direction in which the motor 82 is driven, the drive sprocket 90 serves selectively to advance the cargo positioning conveyor 12 in a cargo loading or cargo unloading mode.

As can readily be appreciated, due to effects of attendant inertia, there is an inherent tendency for stacked cargo to experience lateral instability during loading and the unloading operations of the cargo-handling system 10, as well as during the operative periods of the associated carrier. Therefore, the cargo positioning conveyor 12 further is provided with a vertically disposed, lateral support 100. This support imparts lateral stability to an assembled load of cargo being handled, particularly where the load is assembled as a palletized stack of containers, such as, for example, cases, crates and the like. It is to be understood that the term lateral stability refers to stability of the stacked cargo relative to a laterally extended, vertically oriented plane.

The cargo support 100 preferably includes a movable barrier which is, in effect, a traveling bulkhead designated 102. This bulkhead is fabricated from a vertically spaced pair of coplanar, transversely extended rails 104 interconnected through a plurality of laterally spaced, vertically extended cross bars 106. The spacing of the transverse rails 104, and consequently the lengths of the cross bars 106, depend upon the vertical height of the load of cargo to be received on the upper surfaces of the flight bars 76.

The bulkhead 102 is supported at its opposite ends by a pair of horizontally displaceable cars 110. Each of the cars 110 is supported for longitudinal displacement along the opposite sides of the conveyor 12 by a plurality of casters 112 seated in a channular track 114. Each of the tracks 114 includes a lower rail 116 and an upper rail 118, each of which constitutes mirror images of the other. The opposite ends of the track 114 are unobstructed and thus accommodate an insertion of the casters 112 of the car 110. A multiplicity of support plates 120 is provided for coupling the casters 112 with the cars 110. Where desired, bearing pins 122 are employed in coupling the casters with the plates 120. Each of the plates 120, in turn, rigidly is affixed to a vertically disposed base plate 124 through suitable nut and bolt fasteners 126.

Extended vertically from each of the plates 124 there is a stanchion 128, which is welded or otherwise secured to the plate 124, and is of a height sufficient for mounting the bulkhead 102. Where desired, the stanchion 128 can be formed from angle-iron having a laterally extended mounting surface 130 from which is suspended the bulkhead 102. The bulkhead 102 is, in practice, supported through a plurality of laterally directed buttons 132, FIG. 10. Each of these buttons includes an enlarged head 134 and an elongated, load bearing cylindrical body 136, having a diameter substantially less than the diameter of the head 134.

A coupling plate 138 is extended between the transverse rails 104 and is welded or otherwise rigidly secured to the end portions thereof. These plates are arranged in a parallel relationship with the cross bars 106 and include therein a plurality of vertically extended key-slots 140, each including a circular opening 142 communicating with an elongated opening or slot 144. The key-slots 140 serve to receive therein the laterally extended buttons 132 in order to achieve a buttoning of the stanchions 128 to the bulkhead 102. As can readily be appreciated, the heads 134 of the buttons 132 are inserted through the circular openings 142 whereupon the bulkhead 102 is lowered so that the surfaces of the vertical slot 144 are received and confined between the adjacent surfaces of the heads 134 of the buttons 132 and the mounting surface 13 for thus securing the bulkhead 102 in a mated relationship with the cars 110.

While the cars 110 continue to maintain the vertical disposition of the bulkhead 102, they are advanced in unison as the cargo positioning conveyor 12 is advanced. Such is achieved by coupling the bulkhead 102 to the conveyor 12 by extending the lowermost ends of the cross bars 106 a distance sufficient to be disposed in operative engagement with the segments 78 of the flight bars 76.

Due to the fact that each of the cars 110 can be inserted into the ends of the tracks 114, and the bulkhead 102 subsequently coupled therewith while the cars are displaced to any selected location, the bulkhead 102 readily is positionable at an appropriate location relative to the flight bars 76 so that the cargo support 100 can be associated with the cargo positioning conveyor 12 at any selected point along its length. However, the bulkhead 102 preferably is associated with the leading vertical surface of an assembled load of cargo for imparting lateral stability thereto. Of course, as is readily apparent, the cargo support 100 can be employed at opposite ends of the cargo positioning carrier 12 in order that lateral stability be imparted to the load at opposite ends thereof.

Warehouse Unit

While the cargo positioning conveyor 12, as employed within the cargo compartment 14 of the carrier 16, can be utilized independently of the warehouse unit 18, it is to be understood that the conveyor 12 and the conveyor 20 of the warehouse unit 18 both constitute integral parts of the cargo-handling system 10, and that the unit 18 has particular utility when employed in conjunction with the cargo positioning conveyor 12. The cargo delivery conveyor 20 of the unit 18 is in many respects quite similar to the cargo positioning conveyor 12 of the cargo positioning conveyor. However, it is important to note that the delivery conveyor 20 is supported for mobility by the wheels 24 and struts 22.

The struts 22 depend from a rectangular frame 200, which includes a pair of longitudinally extended beams, designated 202, and a pair of laterally extended terminal beams 204. The longitudinal beams 202 are configued in a manner quite similar in design and function to the longitudinal beams 30, and similarly are employed. The beams 202 also are interconnected through a plurality of transverse beams, designated 206, which are similar to the beams 32 and are employed in joining the longitudinal beams 30. Supported at the upper surface of the transverse beams 206 there is a floor 208 which is fabricated, mounted, and has utility similar to that of the floor 46.

At the opposite ends of the frame 200, there is provided an axle 210 rotatably supported in suitable bearing blocks 212 rigidly coupled to the frame 200 through mounting brackets 214. These brackets, in turn, are welded or are otherwise secured to the terminal beams 204. The manner in which the axles 210 are supported may be varied as preferred, but, in practice, they are secured and supported in a manner quite similar to that in which the axles 68 are coupled to the terminal beams 34 of the cargo positioning conveyor 12.

Each of the axes 210 receives thereon in a concentric relationship a plurality of sprockets 216 which are pinned thereto. The sprockets 216 are paired and are arranged as to establish multiple pairs of longitudinally spaced sprockets. About each pair of the sprockets there is trained an endless conveyor chain 220, having a function quite similar to the function of the conveyor chains 60. Each of the chains 220 includes a plurality of spaced, vertically arranged plates 221, similar to the plates 61. Preferably, the warehouse unit 18 includes three pairs of sprockets laterally spaced at equidistances, however, the number of pairs can be varied as desired. The upper runs of the chains 220 are supported at opposite sides of the warehouse unit 18 in a manner similar to that in which the upper runs of the chains 60 are supported. To achieve this, a guide strip 222 is disposed along the upper horizontal surface 223 of the longitudinal beam 202, in a manner quite similar to that in which the guide strip 64 is secured to the surface 56 of the channnular beam 30.

The lower runs of the chains 220, however, are supported by a pair of longitudinally extended tracks 224 supported above the terminal portions of a plurality of transverse support beams 226. The tracks 224 preferably include an elongated guide strip 222 extended the length thereof in a manner and for a purpose quite similar to that of the guide strips 64 employed in guiding the lower runs of the chains 60.

To the plates 221 of the chains 220 there fixedly is secured a plurality of transverse flight bars 230. The flight bars 230 are formed from axially aligned segments 232 which are butt-welded to the vertical plates 221 for integrating the chains into the driven transport conveyor 20. While the flight bars 230 rest upon the floor 208, as they are advanced along the upper run of the conveyor 20, they also are vertically supported by longitudinal runners 234, mounted on the lower transverse beams 226, as they are advanced along the lowermost run of the conveyor 20.

The cargo delivery conveyor 20 is driven in a manner similar to that in which the cargo positioning conveyor 12 is driven. This is achieved through a power train 236, FIG. 6, which includes a motor 238 rigidly supported by a transverse beam 226. The train 236 also includes a gear driven output coupling 240 to which is connected an output shaft 242. This shaft is disposed in parallel relationship with the axles 210 which support the sprockets 216.

The shaft 242 is supported at its distal end by a bearing block 244 while a drive sprocket 246 is pinned thereto. Hence, the drive sprocket 246 is driven as the output shaft 242 is driven by the output coupling 240. A driven sprocket 248 is pinned to the axle 210 and is coupled with the sprocket 246 through a drive chain 250. This chain is trained about the sprockets 246 and 248 and serves to couple the motor 238 with the conveyor chains 220.

It should readily be apparent that the positioning of the power train 236 is a matter of convenience. However, it is preferred that this power train be disposed adjacent to the leading axle 210 of the unit 18. Additionally, as many motors 238 and associated drive trains as is desired may be coupled with the cargo delivery conveyor 20 for purposes of imparting translation to the conveyor under various load conditions. As illustrated, two interrelated motors 238 and associated drive trains have been found to function quite satisfactorily for this purpose.

The cargo delivery conveyor 20 also is provided with a cargo support 252. The support 252 is of a design and functions in a manner quite similar to the cargo support 100. This support also is supported by a pair of laterally spaced cars, designated 254, which operatively is supported by a plurality of casters 256 seated in a pair of tracks 258 located at opposite sides of the conveyor 20. The tracks 258 include a pair of upper and lower arcuate rails 260 for receiving therein the casters 256. Each of the cars 254 includes a vertically disposed stanchion 262, coupled to bearing plates 264, supported by the casters 256. These plates function in a manner similar to the support plates 120, however, in order to accommodate full displacement of the cars 254, relative to the cargo delivery conveyor 20, the stanchions 262 are of an L-shaped configuration. The configuration of the stanchions 262 permits the cars 254 to be displaced throughout the complete length of the conveyor 20 as a load of cargo is delivered by the cargo delivery conveyor 20 to the cargo positioning conveyor 12.

The cargo support 252 also includes a barrier or transverse gate or traveling bulkhead 266, FIG. 7, coupled between the stanchions 262 for laterally supporting the load as it is delivered. This bulkhead is of a design similar to that of the bulkhead 102. In order to couple the bulkhead 266 to the stanchions 262, each of the stanchions is provided with a right angle member 267, FIG. 9, having a transverse mounting surface 268. From the surface 268 there is extended a plurality of buttons 270 of a design and having a function similar to the buttons 132. As shown in FIG. 7, each of the buttons 270 is received within a key-slot 272 formed in a vertically disposed coupling plate 274 welded to the end of the bulkhead 266. As a practical matter, the bulkhead 266 also includes a pair of parallel, vertically spaced transversely extended rails 276 interconnected through a plurality of laterally spaced, vertically extended cross bars 278. Like the cross bars 106 of the bulkhead 102, the cross bars 278 extend into an engaging relationship with adjacent segments of the flight bars of the associated conveyor, which, in the case of the conveyor 20, are flight bars 230, so that the bulkhead operatively is advanced as the flight bars are advanced through an activation of its associated power train 236.

In order to accommodate vehicles of varying types and sizes, the unit 18 is provided with an elevating system 300 which is effective in varying the elevation of the frame 200, and, consequently, that of the conveyor 20. Therefore, each of the struts 22 which support the frame 200 includes a rigid tubular beam 302, the uppermost end of which is received within a clevislike bracket 304 and is pivotally coupled therewith through suitable pins 306. The brackets 304 are secured to the lowermost positions of the beams 202 through any suitable technique, such as by welding, for example.

Coupled to the lowermost end of each of the beams 302 is a caster 307 including an inverted U-shaped bracket 308 receiving therein one of the wheels 24. The wheels 24 are pinned within the bracket 308 by a suitable axle or bearing pin 312. While the casters 307 are coupled with the beams 302 in any suitable manner, a caster post 314, FIG. 7, seated within sleeves or an annular bearing, not designated, serves quite satisfactorily for this purpose. Of course, the manner in which the caster post 314 is secured to the bracket 308 is a matter of convenience, well within the purview of the art.

The struts 22 are interconnected through a pair of longitudinally extended support beams 316 and a pair of transversely extended support beams 318. The support beams 318 are rigidly secured to their opposite ends to the beams 302 of the struts 22 while the support beams 316 pivotally are coupled to the beams 318 through suitable sleeves 320 concentrically mounted at the opposite ends of the beams 318.

It should readily be apparent that the struts 22 are, in effect, coupled within a parallel linkage and so that the beams 302 are maintained in parallel relationship as they are caused to pivot about the pivot pins 306. Hence, a pivotal displacement of the beams 302 can be achieved and is particularly suited for varying the elevation of the frame 200 relative to the surface upon which the wheels 24 of the casters 307 rest.

In order to impart a pivoting displacement to the beams 302 of the struts 22, a pair of fluid-activated, extendible rams 322 pivotally is coupled with the beams, through clevis couplings 324. In practice, each of the rams 322 includes a reciprocable output shaft, not designated, and is coupled at its heel through a clevis coupling 324 fixed to the frame 200. Hence, as the rams are activated and the shafts thereof simultaneously are extended an afore-and-aft oscillation of the struts 22 is achieved for thus raising and lowering the frame 200. Where desired, a pair of stop rails 328, FIG. 5, can be employed for arresting downward displacement of the frame 200.

In order to achieve a guiding function in positioning the warehouse unit 18 the casters 307 disposed beneath one end of the frame 200 are interconnected through a suitable tie rod 330, FIG. 7, whereby a synchronous and similar pivotal displacement of the casters about the posts 314 can be achieved for the purposes of steering the transport as it is positioned within the system 10. In order to accommodate a pivoting of the casters 307, a socket 332 is fixed to at least one of the brackets 308 whereby a pry-bar manually can be inserted into the socket 332 for purposes of varying the direction of travel imparted to the unit.

As a practical matter, it may be found desirable to employ a power unit coupled for purposes of advancing the unit 18. Therefore, a power train 340, FIG. 5, preferably is coupled with selected casters 307. This train includes a motor 342 having an output sprocket 344 coupled to a driven sprocket 346, through a suitable drive chain 348. The driven sprocket 346 is, in turn, fixed to the wheel 24 of the associated caster 307. Hence, the motor 342 is adapted to be activated to impose a driving rotation on the wheel 24, for thus imparting translation to the warehouse unit 18.

Once the warehouse unit 18 is brought into an operative alignment with a cargo positioning conveyor 12, through an activation of the motor 342, it may be found that the ground or other supporting surface is uneven, and/or that the conveyors 12 and 20 are not in a coplanar relationship. Therefore, at least one of the struts 22 is provided with a vertically extensible ram 350 which is connected with the caster 307, FIG. 7, through a caster post 314, and acts as a jack for varying the elevation of the associated corner of the frame 200 as a fluid under pressure selectively is delivered to or from the ram. As the elevation of the corner is varied, the cargo bearing surface of the cargo delivery conveyor 20 is brought into a coplanar relationship with the cargo positioning conveyor 12 in order that an assembled load of cargo can be exchanged between the conveyors 12 and 20. In practice, the frame 200 is provided with a pair of coaxially aligned openings 351, FIG. 5, which, as alignment of the unit 18 is achieved, are brought into coaxial alignment with a pair of openings 352, FIG. 4, provided in adjacent structure of the carrier 16 in order that a pair of locking pins 353, FIG. 2, can be inserted into the coaxially aligned openings for fixedly coupling the unit 18 with the carrier 16. A plurality of transversely extended, free-running rollers 354 are supported by brackets 356 and pins 358 at the lead portion of the cargo transport and act as bridging conveyors so that the load is supported as it is passed between the conveyors 12 and 20.

Hydraulic System

While the cargo-handling system 10 can be powered by various systems, an hydraulic system driven through a PTO, (power take off), functions quite satisfactorily for this purpose.

As best illustrated in FIG. 2, the reversible motor 82 of the power train 80, the motors 238 of the power train 236, the motor 342 of the power train 340 coupled with a caster 307, and the rams 322 and 350 are connected with an hydraulic circuit generally designated 360 and including both pressure and relief sides. Since hydraulic circuits, particularly those configured in the manner in which the circuit 360 is configured, are well within the purview of the art, a detailed description thereof is, for the sake of brevity, omitted. However, it is to be understood that the aforementioned motors and rams are coupled into the crcuit through suitable pressure and return lines, designated 361. Pressure is controlled with the lines through suitable selector valves, including a first two-way selector valve 362, coupled with the motor 82, a two-way selector valve 364 coupled with the motor 238, a two-way selector valve 366 coupled with the motor 342, a ram selector valve 368 coupled with the pairs of rams 322, and a ram selector valve 370 coupled with the ram 350.

The circuit 360 also includes an hydraulic reservoir and accumulator 371 of a suitable design, coupled within the circuit 360 through the input and output lines 372 and 374, respectively. An hydraulic pump 376, preferably of a piston type, is coupled to the reservoir through the output line 374 in a manner consistent with the design of hydraulic systems. The pump, in turn, is powered through a power take-off unit, of any suitable design, mounted on the carrier 16. However, where found practical, the power take-off unit can be mounted on the warehouse unit 18 in order that the system 10 be rendered adaptable for use with carriers not so equipped.

Since the warehouse unit 18 is, in practice, employed in loading with various types of vehicles, the hydraulic circuit 360 also is provided with a plurality of quick-disconnect couplings 378 so arranged as to accommodate a substantially leakproof coupling of operatively related portions of the circuit 360. In practice, the couplings normally are provided at the junctures of the unit 18 and the cargo compartment 14. It is to be understood that in the interest of versatility, the conduits 361 can be formed as flex-lines rather than rigid tubing, and, as such, facilitate a ready coupling of the circuit components. Of course, where so desired, separate and mutually independent hydraulic circuits can be employed in driving various portions of cargo-handling system 10.

Modified Cargo Positioning Unit

The hereinbefore described cargo carrier serves quite satisfactorily for its intended purpose. However, the hereinafter described modified cargo carrier 379 may be preferred, particularly where a carrier is employed as a delivery vehicle for use in making "short-haul" deliveries, as this carrier includes a modified cargo positioning unit 380.

As a practical matter, the invention previously described is embodied in structure generally corresponding to the structure hereinafter described, therefore, for the sake of convenience, corresponding elements are similarly designated.

Turning now to FIG. 13, it is noted that the compartment 14 of the carrier 16 is provided with a cargo positioning conveyor 12 having four endless chains 60 trained about sprockets 62, FIG. 14, rather than the three such chains illustrated in FIG. 2.

In practice, the upper and lower runs of each of the chains 60 preferably are guided through the use of elongated, U-shaped guides 400 welded or otherwise secured at appropriate locations within the compartment 14. The particular manner in which the U-shaped guides are mounted within the compartment 14 is deemed to be a matter of convenience, and can be mounted in the hereinbefore described manner in which the guide strip 64 is mounted.

Extended transversely of the conveyor 12 is the plurality of load-supporting flight bars 76 upon which discreet articles of cargo can be deposited for transport thereby. As hereinbefore described, each of the flight bars 76 includes a plurality of flight bar segments 78 welded to laterally spaced, overlapping link plates 61. Hence, the flight bars, in effect, collectively serve as a traveling floor for the compartment 14. However, as shown in FIG. 14, the bulkhead 102 preferably is welded to an end-most one of flight bars 76 so that the bulkhead 102 is, in effect, fixedly secured to the conveyor 12, rather than being releasably coupled therewith. Accordingly, the bulkhead 102 and the cars 110 are welded into an integrated unit. While not shown, it is to be understood that the casters 112 preferably assume the configuration of a roller-bearing, rather than a wheel, in order to enhance the strength and loadbearing capability of the bulkhead 102.

For reasons which should readily be apparent, by employing the traveling bulkhead 102 as an integral part of the conveyor 12, it is possible for an operator of the carrier 16 to stow "empties" and "rejects" forward of th traveling bulkhead 102 simply by inserting them through the access opening normally closed by the door 15. As a practical matter, where desired, the bulkhead 102 can be advanced toward the forward portion of the compartment 14 in order to support the articles of cargo so that shifting of the thus stowed cargo is avoided. All of this can be accomplished witout reorienting a load supported on the surface of the flight bar 76 since the conveyor 12 can readily be activated for returning cargo supported thereon to the discharge portion of the compartment. Thus, the efficiency of the operation of the cargo carrier 16 and its operator is greatly enhanced.

In order to further increase the efficiency of the carrier 16, as well as its operator, it has been found desirable to provide a carrier with an elevator 410 mounted on the carrier in juxtaposition with the discharge opening located at the rear of the compartment 14, as illustrated in FIG. 13. The elevator 410, as a practical matter, is a modified form of so-called "easy-lift" elevators frequently employed in loading and unloading cargo carriers similar to the cargo carrier 16. Therefore, the particular linkage utilized for raising and lowering the elevator 410 can be varied as is desired. However, for purposes of providing a complete understanding of the instant invention, the elevator 410 is deemed to be supported by a parallel linkage 412, FIG. 16, supported for rotation about a pair of vertically spaced coplanar axes 414 and 416.

The parallel linkage 412 includes a pair of laterally spaced lifting arms 418, only one of which is shown, and a pair of laterally spaced support arms 420, only one of which also is shown. The arms 418 and 420 are pivotally supported at their base and extend in a cantilevered fashion into supporting engagement with a pair of vertical support beams 422 disposed immediately to the rear of the cargo compartment 14, only one of which is shown in FIG. 16. Thus, any oscillating motion imparted to the arms 418 and 420, relative to the axes 414 and 416 serves to impart vertical motion to the pair of vertical support beams 422.

In order to achieve a desired oscillation for the arms 418 and 420 there is provided a drive shaft 424 concentrically related to the axis 414 which is fixedly secured, at each of its opposite ends, to one of the arms 418. From the drive shaft 424 there is radially extended an actuating arm 426, the distal end thereof being coupled with a rectilinearly reciprocable actuating shaft 428, preferably extended from an hydraulic actuator designated 430. As a practical matter, the actuator 430 and the shaft 424 are supported by suitable bearing structures well within the purview of the art. While not shown, it is to be understood that the actuator 430 is coupled within the circuit 360 through the use of a suitable selector valve similar to the valve 368 shown in FIG. 12. Since the actuator can be coupled in the circuit in any suitable manner, a detailed description thereof is omitted. It is, however, to be understood that as rectilinear motion is imparted to the shaft 428, rotary oscillating motion is imparted to the drive shaft 424, whereupon rectilinear motion is imparted to the beams 422 through the parallel linkage 412 for raising and lowering the elevator 410.

The elevator 410, at the uppermost end of each of the vertical support beams 422, is provided with a pair of pivotally supported lateral supports 432. In practice, each of the supports 432 is a beam pivotally connected with one of the beams 422 by a suitable pivot pin 434 extended therethrough. Thus, oscillation of each of the supports 432, relative to a beam 422 is accommodated.

In order to retain the lateral supports 432 in a fixed relationship relative to the beams 422 there is provided a pair of over-center or toggle linkages 436, only one of which is shown. Each of the linkages extends between an adjacent support 432 and a beam 422 and includes an over-center toggle pin and latch, collectively designated 438. Since toggle linkages are well known, a detailed description is omitted. However, it is to be clearly understood that through the linkage 436 pivotal displacement of the support 432, relative to the beam 422, selectively is accommodated or precluded.

Located between the supports 432 there is a plurality of parallel, free-running, cylindrical rollers 440 which serve to receive along their uppermost surfaces cargo being repositioned relative to the supporting surface of the conveyor 12. Thus, articles of cargo can be rolled along the surface of the rollers 440, during both loading and unloading operations.

As a practical matter, the rearmost end portion of the elevator 410 is provided with a pivotally supported bumper 442 for engaging a supporting surface when the elevator 410 is lowered into its lowermost position and the linkage 436 broken. The particular vertical dimension of the bumper 442 is dictated, in part, by the distance through which the support 432 must, in operation, be rotated about the pivot pins 434. Furthermore, the bumper 442 can be pivoted into and secured by any suitable means, in alternate positions above and below the plane of the rollers 440 for thus serving as a "stop" for cargo supported by the rollers 440 in addition to acting as a bumper when the elevator is lowered.

As a practical matter, a bridge 444, FIG. 16, is particularly suited for use in bridging the span between the end portion of the conveyor 12 and the elevator 410. This bridge includes a plurality of brackets 446 between which is there extended a plurality of cylindrical, free-running rollers 448. The lowermost end of each of the brackets 446 is provided with an arresting shoulder 450, the purpose of which is to engage the adjacent surfaces of openings 452 provided to receive the lowermost ends of the brackets 446. Thus, the bridge 444 is, in operation, supported in a position such that the rollers 448 are arranged in a coplanar relationship with the flight bars 76 as well as the rollers 440 of the elevator 410. Of course, the space between the end of the conveyor 12 and the elevator 410 is minimal, hence the ultimate weight which must be supported by the bridge 444 can be considered to be minimal as articles of cargo are advanced thereacross between the elevator 410 and the conveyor 12.

Electrical System.

As illustrated in FIG. 18, the hydraulic circuit 360 of the cargo-handling system 10 can be replaced by an electrical circuit 459 which includes a plurality of reversely energizable electric motors 460 and a D.C. (Direct Current) source of electrical potential 462. This circuit also includes a plurality of multi-position switches 464 employed for selectively energizing the motors 460 in reversing modes of operation. Since the particular type of switch and motor employed forms no particular part of the instant invention, a detailed description thereof is omitted in the interest of brevity. However, it is to be understood that the motors 460 are coupled with the plurality of drive sprockets 62 for the cargo positioning conveyor 12, as well as the plurality of sprockets provided for the conveyor 20 of the warehouse unit 18, in a manner consistent with known machine design techniques. Furthermore, where so desired, one of the motors 460 is utilized in driving the parallel linkage 412 employed in operating the elevator 410 and is coupled within the electrical circuit 459. This circuit, of course, performs a function quite similar to that performed by the hydaulic system, as hereinbefore described. Since a detailed description of the circuit 459 which includes the electrical motors 460, voltage source 462 and switches 464 is not believed necessary for providing a complete understanding of the invention, it is omitted in the interest of brevity.

Operation of Cargo Positioning Unit

It is believed that in view of the foregoing description, the operation of the system will be readily understood and it will be briefly reviewed at this point. The aforedescribed cargo-handling system 10 is employed in loading, as well as unloading, given carriers 16, such as trucks and the like. Where the carrier 16 is being loaded, the load normally id delivered from the dock 26 to the cargo compartment 14, through a rearwardly facing opening. However, if the carrier 16 is being unloaded, the load is removed from the compartment 14, through the same opening. In either case, the system 10 is employed in a similar fashion between a warehouse dock 26 and a carrier 16.

Preferably, the unit 18 is so positioned such that the carrier 16 is readily aligned therewith. Normally, this is achieved by manually positioning the unit 18. However, where a power take-off is provided, the motor 342 is activated through a manipulation of the selector valve 368 in order to impart rotation to a caster 307. Steerage of the unit 18 is achieved by inserting a bar into the socket 332 and selectively rotating the casters 307 about their caster posts 314.

As the carrier 16 is brought into an operative alignment, the parallel linkage, including the struts 22, operatively is displaced through a selective manipulation of the selector valve 368 so that the frame 200 is elevated or depressed a distance sufficient for positioning the load-supporting surface of the cargo delivery conveyor 20 into a common elevation with the supporting surface of the cargo positioning conveyor 12. In order to assure that a suitable coupling is achieved between the carrier 16 and the unit 18, the foremost end of the frame 200 is projected to a position slightly above the adjacent end of the floor 42 of the carrier 16. The struts 22 then are displaced in a manner such as to cause the projected end of the frame 200 to engage and rest upon the adjacent end of the floor 42. A coupling is effected in a manner such that the end of the frame 200 is supported by the floor of the cargo carrier 16. Of course, the openings 351 and 352 also are brought into coaxial alignment so that the locking pins 353 can be inserted for achieving a positive interlocked coupling of the unit and the cargo carriers. Where desired, adjustment of the plane of the conveyor 20, relative to the plane of the conveyor 12 is achieved simply by displacing the ram 350 through a selective manipulation of the selector valve 370.

As the carrier 16 is aligned with the unit 18, for purposes of coupling the cargo-handling system 10 into an operative unit, the rollers 354 are received adjacent to the rearmost end of the cargo positioning conveyor 12. Once an appropriate alignment has been achieved, the hydraulic circuit 360 is completed at the quick-disconnects 378 so that the various power trains thus are prepared to be energized.

Where the cargo-handling system 10 is employed in a cargo loading mode, the cargo positioning conveyor 12 is readied by inserting the cars 110 in the tracks 114, whereupon the bulkhead 102 is coupled with the stanchions 128 through the buttons 132. These buttons are received within the key-slots 140 of the coupling plates 138. With the cargo support 100 thus assembled and associated with the conveyor, the power train 80 is energized for advancing the conveyor in a manner such that the lowermost ends of the bars 106 are engaged by the flight bars 76 for advancing the bulkhead 102 as the conveyor 12 is advanced for shifting received cargo. This advancement of the conveyor is initiated through an appropriate manipulation of the selector valve 364.

In preparing the warehouse unit 18 for a loading operation, a load of cargo, which may include cartons, crates and similar containers, is deposited on the cargo bearing surface of the cargo delivering conveyor 20 at locations adjacent to the dock 26. Depositing of the cargo is achieved through a use of forklifts and similar devices, as well as through manual stacking operations. As the stacks are "built," the selector valve 364 is manipulated for advancing the conveyor 20 through predetermined increments of travel, whereupon additional stacks are built on the load bearing surface of the conveyor 20. Consequently, the warehouse unit 18 incrementally is loaded, as best illustrated i FIG. 1. Once loaded, the cars 254 are mounted, through an insertion of the caster 256 into the tracks 258, whereupon the bulkhead 266 is coupled with the stanchions 262. A load thus supported by the unit 18 is prepared for delivery to the adjacent cargo positioning conveyor 12 within the compartment 14. A simultaneous manipulation of the selector valves 364 and 362 serves to synchronously advance the cargo positioning conveyor 12 and the cargo delivery conveyor 20 so that the load of cargo supported by the conveyor 20 is advanced across the rollers 354 and onto the flight bars 76 of the cargo positioning conveyor 12. A continued advancement of the conveyors 12 and 20 serves to deliver the load to the cargo compartment 14 and, consequently, shifts the load of cargo to the remote portions of the cargo compartment 14. It should readily be apparent that due to the L-shaped configuration of the cars 254, the bulkhead 266 follows the load to the extremity of the conveyor 20. Once the assembled load of cargo is delivered to the cargo compartment 14, the load is secured in any suitable manner and transported by the carrier 16 to a point or multiple points of delivery.

It is to be understood that an unloading of the thus loaded carrier is achieved in a reversed operation whereby the cargo is discharged from the cargo compartment 14 to the cargo warehouse unit 18 by activating the cargo positioning conveyor 12 in a cargo discharging mode. Of course, it is to be understood that the unit 18 is positioned so that its cargo delivery conveyor 20 is aligned between the cargo positioning conveyor 12 and the dock 26. In unloading a loaded cargo compartment 14, the cargo supports 100 and 252 also are employed, but in a manner reversely related to that heretofore described. This is achieved by positioning the cars 254 in a receiving disposition at the foremost end portion of the conveyor 20, once an assembled load has been disgorged from the cargo compartment 14. Once the load has been delivered to the unit 18, it is unloaded in increments while the selector valve 364 manually is manipulated for activating the motor 238 for intermittently or, where preferred, continuously advancing the cargo delivery conveyor 20 for purposes of achieving a total discharge of the cargo from its load supporting surface thereof.

It is quite important here to understand that the cargo compartment 14 can readily be unloaded manually and in increments, simply by advancing the load in incremental steps toward the opening of the cargo component through an intermittent advancement of the conveyor 12. In such instances, an operator need never enter the compartment 14 of the carrier 16 in delivering cargo to the discharge opening of the compartment. This, of course, results in substantial savings in labor costs.

Operation Of The Modified Positioning Unit

The operation of the modified cargo carrier 379 and its cargo positioning unit 380 is quite similar to that hereinbefore described with respect to the cargo carrier 16 and its positioning unit 28 and, as will be appreciated, both the cargo positioning unit 380, as well as the unit 28, have utility separate and apart from the cargo-handling system 10, hereinbefore described. Furthermore, it is to be understood that the operation of the units 28 and 380 is substantially unaffected by the particular circuitry employed, so long as a rectilinear output is imparted to the units.

The cargo positioning conveyor 12 of the cargo positioning unit 380 preferably is employed in instances wherein cargo is being distributed, as partial loads, in short-haul environments. Therefore, an operator upon having cargo stowed within the compartment 14 of a carrier 16 is afforded an opportunity to deliver multiple partial loads to numerous points of delivery without ever entering the cargo compartment. In practice, the operator merely closes the appropriate selector valve 362 or a switch 464, for selectively advancing the cargo positioning conveyor 12 so that cargo supported thereby is displaced relative to the discharge opening of the compartment 14.

When unloading cargo from the compartment 14, the cargo is caused to approach the discharge opening of the compartment 14, whereupon the operator is afforded an opportunity to discharge the cargo through a manual operation. However, in instances where the elevator 410 and the bridge 444 are employed, the operator causes the conveyor 12 to transport the cargo to the end of a conveyor in juxtaposition with the discharge opening and thereafter push the cargo across the rollers 448 of the bridge 444 onto the rollers 440 of the elevator 410, whereupon the motion of the cargo is arrested by the bumper 442 in its elevated position. Having thus advanced the partial load of cargo onto the elevator 410, the operator activates the elevator 410, through a manipulation of the appropriate selector valve or the switch 464, for thus causing the drive shaft 424 to be driven in rotation. In instances where the hydraulic system is being employed, the hydraulic actuator 430 is selectively activated by closing an approrpiate hydraulic selector valve coupled with an actuator, in a manner not shown, for driving the drive shaft 424 in rotation whereupon the parallel linkage 412 is caused to lower the elevator 410 to ground level.

Once the elevator 410 is lowered, the bumper 442 is lowered to a depressed position so that the operator is permitted to "break" the toggle linkage 436 for thus permitting the supports 432 to rotate about their pivot pin 434. As the beams pivot the bumper 442 is caused to engage the ground, or any cargo receiving surface, so that the plane of rollers 440 now is inclined with respect to the receiving surface. Since the rollers 440 are free-running rollers, it is only necessary for the vehicle operator to advance the carrier 16 for thereby causing the cargo to roll free of the elevator 410.

It will, of course, be appreciated that the specific material employed in fabricating the elevator 410 is dictated, in part, by the specific manner in which the elevator is, in operation, employed. In any event, it is to be understood that the purpose and function of the elevator 410 is to deliver partial loads from the conveyor 12 of the cargo positioning unit 380 to ground level through an exercise of minimal efforts. Further, once a partial load has been delivered, the elevator may be repositioned simply be reversing the direction of rotation of the drive shaft 424 through a reconditioning of the circuit.

In practice, should an operator be required to return cargo to the point at which the cargo initially was received, he merely opens the door 15 and introduces the cargo into the compartment 14 ahead of the traveling bulkhead 102 and thereupon reverses the direction of travel of the bulkhead 102 for bringing the bulkhead into supporting engagement with the inserted cargo. Since the cargo positioning conveyor can readily be reactivated for repositioning the cargo adjacent the discharge opening of the compartment 14, at the next delivery "stop," the overall cargo-handling operation greatly is enhanced through a use of the traveling bulkhead.

In view of the foregoing, it should readily be apparent that the cargo positioning conveyor 12 of the cargo positioning unit 380 within the cargo carrier provides a practical solution to the perplexing problem of reducing labor costs and injury to operators, while improving working conditions for the operators of cargo carriers.

In view of the foregoing, it is to be understood that the systems of the instant invention provide for a safe, economic and rapid handling of cargo whereby significant savings in both time and labor are achieved.

Although the invention has been shown and described in what are conceived to be the most practical and preferred systems, it is recognized that departures may be made therefrom within the scope of the invention, which is not to be limited in the illustrative details disclosed.

Having described my invention, what I claim as new and desire to secure by Letters Patent is:

1. In a cargo positioning unit for a carrier having a cargo compartment, the improvement comprising:
  A. a horizontally oriented, endless conveyor supported within said compartment including an idler sprocket assembly and a driven sprocket assembly, said sprocket assemblies being supported for rotation about a pair of mutually spaced horizontally oriented axes, a plurality of horizontally extended endless chains trained about said sprocket assemblies and a cargo supporting platform comprising a plurality of horizontally extended juxtaposed flight bars arranged in mutual parallelism fixed to said chains;
  B. a traveling bulkhead having a cargo-engaging face of a substantially planar configuration projected vertically from the plane of said cargo supporting platform; and
  C. support means for supporting said bulkhead in juxtaposition with a selected flight bar including a pair of tracks extended along opposite sides of said conveyor, a pair of cars, each of said cars including rolling members coupled in a confined relationship with one of said tracks, and means for releasibly coupling said cars with the opposite ends of said bulkhead.

2. The improvement of claim 1 wherein said means for releasibly coupling said cars with said bulkhead includes a plate disposed in a vertically oriented plane in juxtaposition with said bulkhead and affixed to one of said cars, means defining within said plate an opening, and a button seated in said opening and affixed to said bulkhead.

3. The improvement of claim 2 wherein said support means further includes a plurality of vertically oriented cross bars projected downwardly from said bulkhead into engagement with said selected flight bar.

4. In a cargo positioning unit for a carrier having a cargo compartment, the improvement comprising:
  A. a horizontally oriented endless conveyor supported within said compartment including a plurality of horizontally extended endless chains and a cargo-supporting platform comprising a plurality of horizontally extended juxtaposed flight bars arranged in mutual parallelism and affixed to said chains;
  B. a traveling bulkhead having a cargo-engaging face of a substantially planar configuration projected vertically from the plane of said platform and including a plurality of vertically oriented flight bars extended between a pair of juxtaposed flight bars; and
  C. support means for supporting said bulkhead including a pair of tracks extended along opposite ends of said conveyor, a pair of cars, each having a plurality of rolling members coupled in a confined relationship with one of said tracks, and means for releasibly coupling said cars with said bulkhead, including a vertically oriented plate extended from each of said cars into juxtaposition with said bulkhead, means defining within each of said plates an opening, and means including a button seated in the opening of each of said plates and rigidly affixed to said bulkhead.

* * * * *

UNITED STATES PATENT OFFICE
CERTIFICATE OF CORRECTION

Patent No. 3,837,508          Dated September 24, 1974

Inventor(s) William L. Stefanelli

It is certified that error appears in the above-identified patent and that said Letters Patent are hereby corrected as shown below:

Column 1, line 15, delete "betwen" and insert ---between---.

Column 3, line 23, delete "4." and insert "FIG. 4".

Column 5, line 14, delete "where" and insert ---Where---;

line 31, delete "planer" and insert ---planar---;

line 45, delete "I" and insert ---In---; and line 57, delete "sprocketsupport" and insert ---sprocket-support---.

Column 8, line 32, delete "figued" and insert ---figured---; and line 52, delete "axes" and insert ---axles---.

Column 10, line 57, delete "to" and insert ---at---.

Column 11, line 9, delete "324" and insert ---326---.

Column 12, line 18, delete "crcuit" and insert ---circuit---.

Column 13, line 45, delete "witout" and insert ---without---.

Column 15, line 63, delete "id" and insert ---is---; and line 66, delete "compartement" and insert ---compartment---.

Column 17, line 5, delete "i" and insert ---in---.

Column 20, line 37, delete "ends" and insert ---sides---.

Signed and sealed this 3rd day of December 1974.

(SEAL)
Attest:

McCOY M. GIBSON JR.
Attesting Officer

C. MARSHALL DANN
Commissioner of Patents